(12) United States Patent
Zhang

(10) Patent No.: US 10,516,712 B2
(45) Date of Patent: Dec. 24, 2019

(54) STREAMING MEDIA DATA TRANSMISSION METHOD, CLIENT AND SERVER

(71) Applicant: BOE TECHNOLOGY GROUP CO., LTD., Beijing (CN)

(72) Inventor: Chuxiong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/895,378

(22) PCT Filed: Jun. 18, 2015

(86) PCT No.: PCT/CN2015/081737
§ 371 (c)(1),
(2) Date: Dec. 2, 2015

(87) PCT Pub. No.: WO2016/112639
PCT Pub. Date: Jul. 21, 2016

(65) Prior Publication Data
US 2016/0212189 A1    Jul. 21, 2016

(30) Foreign Application Priority Data
Jan. 16, 2015    (CN) .......................... 2015 1 0024568

(51) Int. Cl.
*H04L 29/06*    (2006.01)
*H04N 21/2343*    (2011.01)
(Continued)

(52) U.S. Cl.
CPC ...... *H04L 65/4092* (2013.01); *H04L 65/4076* (2013.01); *H04L 65/4084* (2013.01);
(Continued)

(58) Field of Classification Search
CPC ......... H04N 21/2181; H04N 21/23439; H04N 21/26216; H04N 21/44209; H04N 21/4621; H04L 1/0046
See application file for complete search history.

(56) References Cited

U.S. PATENT DOCUMENTS 8,230,288 B2 *   7/2012  Kwon ................... H04L 1/1819
                                                         714/748
2003/0236906 A1 * 12/2003  Klemets .................. H04N 5/76
                                                         709/231
(Continued)

FOREIGN PATENT DOCUMENTS

CN    101227590 A    7/2008
CN    101471919 A    7/2009
(Continued)

OTHER PUBLICATIONS

Search Report and Written Opinion dated Oct. 14, 2015 from State Intellectual Property Office of the P.R. China.
(Continued)

*Primary Examiner* — Barbara B Anyan
(74) *Attorney, Agent, or Firm* — Dilworth & Barrese, LLP.; Michael J. Musella, Esq.

(57) ABSTRACT

A streaming media data transmission method, client and server are used to solve the problem of long time delay of decoding because the client waits a segment with a higher code rate. The client includes: a first processing module configured to determine whether a server distributes a plurality of segments with same content and different code rates; and a second processing module configured to determine whether the server transmits a segment with a high code rate first or transmits a segment with a low code rate first when the first processing module determines that the server distributes a plurality of segments with same content and different code rates. When the client determines that the
(Continued)

server transmits the segment with a high code rate first, a received segment is decoded directly, thereby shortening time delay of decoding at the client.

15 Claims, 6 Drawing Sheets

(51) Int. Cl.
*H04N 21/442* (2011.01)
*H04N 21/6373* (2011.01)
*H04L 29/08* (2006.01)
*H04L 1/18* (2006.01)

(52) U.S. Cl.
CPC .......... *H04L 65/604* (2013.01); *H04L 65/607* (2013.01); *H04L 65/608* (2013.01); *H04L 65/80* (2013.01); *H04L 67/02* (2013.01); *H04L 67/42* (2013.01); *H04N 21/23439* (2013.01); *H04N 21/44209* (2013.01); *H04N 21/6373* (2013.01); *H04L 1/1819* (2013.01); *H04L 1/1845* (2013.01)

(56) References Cited

U.S. PATENT DOCUMENTS

| 2010/0023579 | A1* | 1/2010 | Chapweske | ........ H04N 7/17336 |
| --- | --- | --- | --- | --- |
| | | | | 709/203 |
| 2010/0121901 | A1 | 5/2010 | Sumiyoshi | |
| 2010/0246491 | A1* | 9/2010 | Bae | ........................ H04L 1/1845 |
| | | | | 370/328 |
| 2012/0155358 | A1 | 6/2012 | Hao et al. | |
| 2012/0324122 | A1* | 12/2012 | Miles | ................... H04L 65/4084 |
| | | | | 709/231 |
| 2013/0111028 | A1 | 5/2013 | Kondrad | |
| 2013/0170561 | A1* | 7/2013 | Hannuksela | ..... H04N 21/23424 |
| | | | | 375/240.25 |
| 2015/0256906 | A1* | 9/2015 | Jones | ................... H04L 65/4076 |
| | | | | 725/109 |

FOREIGN PATENT DOCUMENTS

| CN | 102143384 A | 8/2011 |
| --- | --- | --- |
| CN | 102307302 A | 1/2012 |
| CN | 102801690 A | 11/2012 |
| CN | 103248962 A | 8/2013 |
| CN | 103747283 A | 4/2014 |
| CN | 104202618 A | 12/2014 |
| CN | 104581229 A | 4/2015 |
| JP | 2007214675 A | 8/2007 |
| JP | 2009206564 A | 9/2009 |
| JP | 2010114815 A | 5/2010 |
| KR | 1020030079337 A | 10/2003 |
| KR | 1020090022615 A | 3/2009 |
| WO | 2014045768 A1 | 3/2014 |
| WO | 2014063726 A | 5/2014 |

OTHER PUBLICATIONS

Chinese First Office Action dated Mar. 24, 2017.
Chinese Office Action dated Sep. 13, 2017.
European Search Report dated Jun. 14, 2018.
Notice of Allowance issued by the Korean Patent Office dated Mar. 28, 2019.
First Japanese Office Action dated Mar. 4, 2019.
Korean Office Action dated Feb. 27, 2018.

* cited by examiner derstanding # STREAMING MEDIA DATA TRANSMISSION METHOD, CLIENT AND SERVER

TECHNICAL FIELD

The present disclosure relates to streaming media technology, in particular to a streaming media data transmission apparatus, method and system.

BACKGROUND

In the case of adopting traditional streaming media technology, transmitted streaming media data needs to go through a firewall, and a professional media server is required to support streaming media technology. In addition, implementation of the traditional streaming media technology is relatively complicated. At present, internet streaming media technology that transmits streaming media data over internet has emerged, which does not propose additional requirement for the existing internet system, but amends storage and information description manners of media files so that streaming media data is transmitted through existing HTTP protocol.

Dynamic adaptive streaming over HTTP (DASH) standard formulated by the moving pictures experts group (MPEG), called MPEG DASH standard for short, provides a standardization scheme of adopting the internet streaming media technology to transmit streaming media data.

Hierarchy structure model of media presentation description defined by MPEG DASH is as shown in FIG. 1.

In the hierarchy structure model, period is used to describe media content that can be played for a period of time, and media content described by periods of time whose sequence are adjacent is continuous in time. One period includes a plurality of adaptation sets, each adaptation set describes media content adaptive to a plurality of code rates, and each code rate is corresponding to one representation. Representation describes information of media content such as specific encapsulation format, code rate and encoding/decoding parameters and so on. One representation includes uniform resource locators (URL) of a plurality of segments, where an uniform resource locators (URL) is used to indicate storage location of a corresponding segment. The segment includes specific media content, i.e., audio, video, caption and multiplexed audio and video and so on.

An optional solution of transmitting streaming media data over Internet based on the above discussed MPEG DASH standard is: firstly establishing a WebSocket two-way connection, transmitting control information of the MPEG DASH standard through WebSocket text frames, and transmitting segments through WebSocket binary frames.

A process of a client's representation of media content under a framework as shown in FIG. 1 is shown in FIG. 2. The process of the client's representation of media content under a framework as shown in FIG. 1 comprises following steps.

In step S201, the client transmits an OpenMedia message to the server. The client indicates media needed to be played to the server by carrying an URL address of the MPD in the message.

In step S202, the server transmits a MediaInfo message to the client, to inform information of media (such as the media is ready) to the client.

In step S203, the client transmits a StartStream message to the server, to request the server to distribute media.

In step S204, the server transmits a StreamInfo message to the client, to inform information of media stream to the client.

In step S205, the server starts to distribute media segments.

After the client requests the server to start playing media, the server can carry, in the StreamInfo message transmitted to the client, indication information multipleRepresentation used to indicate whether the server would distribute a plurality of representations with same content and different code rates in step S204 in FIG. 2. If this indication information indicates that the server would distribute a plurality of representations with same content and different code rates, then the server would transmit to the client a plurality of segments with same content and different code rates (i.e., segments with same content and different code rates included in the plurality of representations) when transmitting segments.

The OpenMedia message, MediaInfo message, StartStream message and StreamInfo message in the above process can be considered as messages extended over the WebSocket protocol with respect to the MPEG DASH standard and transmitted through the WebSocket text frames.

However, the client does not know the segment transmitted first by the server is a segment with a high code rate or a segment with a low code rate.

A known implementation comprises: after receiving one segment, the client determines within a preset waiting period of time whether a segment with a higher code rate is received; if the segment with a higher code rate is received, then the segment with a higher code rate is decoded and represented; if no segment with a higher code rate is received, then the segment received previously is decoded and represented.

For the case that the server transmits the segment with a high code rate first, in the above implementation, after receiving the segment with a high code rate, the client would still wait for the preset waiting period of time because the client does not know whether the segment with same content and different code rate transmitted by the server subsequently is a segment with a higher code rate or a segment with a lower code rate, which results in an increase of time delay of decoding at the client.

SUMMARY

The present disclosure provides a streaming media data transmission apparatus, method and system, which are used to solve the problem of long time delay of decoding because the client waits a segment with a higher code rate.

According to one aspect of the present disclosure, there is provided a client comprising a first processing module configured to determine whether a server distributes a plurality of segments with same content and different code rates; a second processing module configured to determine whether the server transmits a segment with a high code rate first or transmits a segment with a low code rate first when the first processing module determines that the server distributes the plurality of segments with same content and different code rates.

According to a second aspect of the present disclosure, there is provided a server comprising: a processing module configured to determine whether a segment with a high code rate is transmitted first or a segment with a low code rate is transmitted first when a plurality of segments with same content and different code rates are distributed to a client;

and a transceiver module configured to send first indication information used to indicate whether the segment with a high code rate is transmitted first to the client.

According to a third aspect of the present disclosure, there is provided a streaming media data transmission method comprising: determining whether a server distributes a plurality of segments with same content and different code rates; and determining whether the server transmits a segment with a high code rate first or transmits a segment with a low code rate first if the server distributes the plurality of segments with same content and different code rates.

According to a fourth aspect of the present disclosure, there is provided another streaming media data transmission method comprising: determining whether a segment with a high code rate is transmitted first or a segment with a low code rate is transmitted first when a plurality of segments with same content and different code rates are distributed to a client; and sending first indication information used to indicate whether the segment with a high code rate is transmitted first to the client.

According to a fifth aspect of the present disclosure, there is provided a streaming media data transmission system, comprising a client and a server, wherein the client is configured to determine whether the server distributes a plurality of segments with same content and different code rates, and then determine whether the server transmits a segment with a high code rate first or transmits a segment with a low code rate first if the server distributes the plurality of segments with same content and different code rates; and the server is configured to distribute the media segments to the client.

To sum up, in the embodiments of the present disclosure, the client is capable of determining whether the server transmits the segment with a high code rate first or transmits the segment with a low code rate first. Therefore, when the client determines that the server transmits the segment with a high code rate first, the client can directly decode a received segment without waiting the server to distribute the segment with a higher code rate, so that time delay of decoding at the client is shortened.

DETAILED DESCRIPTION

Embodiments of the present disclosure propose a streaming media data transmission apparatus and method, which are used to solve the problem of long time delay of decoding because a client waits a segment with a higher code rate.

Embodiments of the present disclosure will be described below in detail by combining with accompanying drawings. First, a streaming media data transmission system provided in an embodiment of the present disclosure will be introduced; then, a client and a server provided in embodiments of the present will be introduced respectively; last, two kinds of stream media data transmission methods provided in embodiments of the present disclosure will be introduced.

Figure 3:
FIG. 3 is a schematic diagram of a structure of a streaming media data transmission system provided in an embodiment of the present disclosure.

FIG. 3 is a schematic diagram of a structure of a streaming media data transmission system provided in an embodiment of the present disclosure. As shown in FIG. 3, the system comprises: a client 301 and a server 302.

The client 301 determines whether the server 302 distributes a plurality of segments with same content and different code rates. In the case of determining that the server 302 distributes the plurality of segments with same content and different code rates, the client 301 further determines whether the server 302 transmits a segment with a high code rate first or transmits a segment with a low code rate first.

The server 302 distributes media to the client 301.

In FIG. 3, for the purpose of a simple diagram, only one client 301 and one server 302 are shown. In fact, one server 302 can distribute media to a plurality of clients 301. Also, one client 301 can request a plurality of servers 3022 to distribute media respectively.

Figure 1:
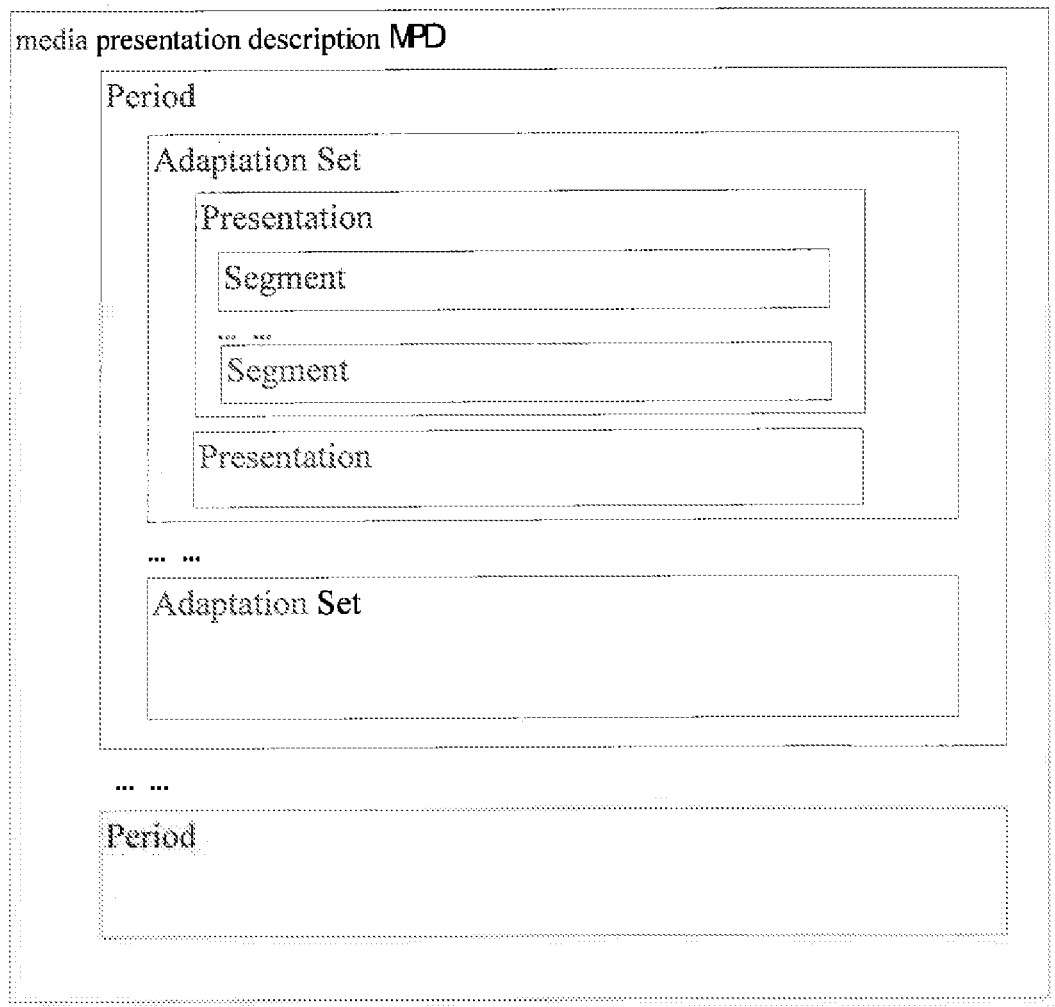
FIG. 1 is a model diagram of a MPD hierarchy structure defined by MPEG DASH standard.
Figure 2:
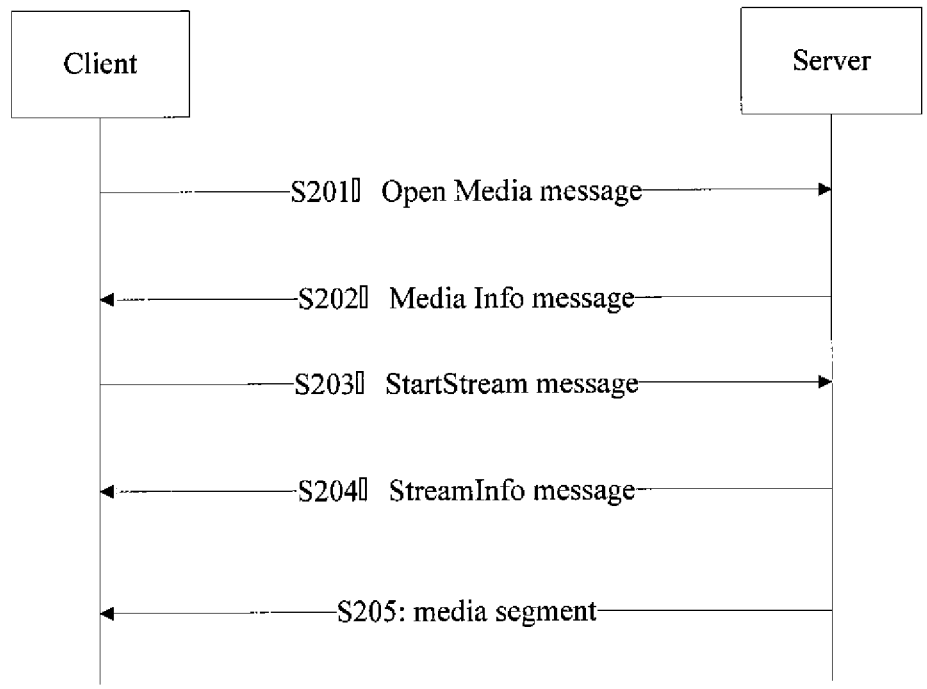
FIG. 2 is a schematic flowchart of a process that a client represents media content under a framework as shown in FIG. 1.

In the embodiment of the present disclosure, optionally, the client 301 establishes a WebSocket two-way connection with the server 302. Streaming media transmission is performed based on the established WebSocket two-way connection. The client 301 can request the server 302 to distribute media in step S203 in FIG. 2, that is, the client 301 transmits a StartStream message to the server 302 to request a media stream.

For example, the client 301 can determine whether the server 302 transmits the segment with a high code rate first or transmits the segment with a low code rate first after it requests the server 302 to distribute media and before the server 302 distributes respective segments to the client 301. Alternatively, the client 301 can also determine, in the process of the server 302 distributing media, whether the server 302 transmits the segment with a high code rate first or transmits the segment with a low code rate first.

In particular, the server 302 can indicate to the client 301 whether the server 302 distributes a plurality of segments with same content and different code rates through a multipleRepresentation key in the StreamInfo message transmitted to the client 301. When a value of the key is "true", the client 301 is indicated that the server 302 distributes the plurality of segments with same content and different code rates.

At present, a format of the StreamInfo message is as shown in Table 1.

TABLE 1

| Name of key | Type of value | Description |
| --- | --- | --- |
| streamDescriptor | Number | streamDescriptor |
| mediaDescriptor | Number | segmentDescriptor |
| multipleRepresentation | Boolean | optional, a value of true indicates that the server transmits a plurality of segments with same content and different code rates to the client |
| segmentSkipped | Boolean | optional, a value of true indicates that the server skips some segments to distribute and live-broadcast the newest segments |
| minBufferTime | Number | optional, minimum buffer time |
| minNetworkBufferTime | Number | optional, denoting duration of data to be buffered at least by the client when it starts to decode segment data |
| Segment | Object | optional, denoting attribute of segments in subsequent binary frames |

In particular, in the case that the client 301 determines, in the process of the server 302 distributing media, whether the server 302 transmits the segment with a high code rate first or transmits the segment with a low code rate first, the client 301 can determine whether the server 302 transmits the segment with a high code rate first or transmits the segment with a low code rate first through the following mode 1 or mode 2. In the case that the client 301 determines, before the server 302 distributes the respective segments, whether the server 302 transmits the segment with a high code rate first or transmits the segment with a low code rate first, the client 301 can determine whether the server 302 transmits the segment with a high code rate or transmits the segment with a low code rate first through the following mode 2.

Mode 1: the client 301 performs determining by itself.

If the client 301 receives a first segment transmitted by the server 302 having a code rate being a preset upper limit code rate (for example, the client 301 knows in advance a maximum code rate of the respective segments distributed by the server 302 to the client 301, and then the maximum code rate is set as the preset upper limit code rate) after the client 301 requests the server 302 to distribute media, then the client 301 determines that the server 302 transmits the segment with a high code rate first. If the client 301 receives a first segment transmitted by the server 302 having a code rate being a preset lower limit code rate (for example, the client 301 knows in advance a minimum code rate of the respective segments distributed by the server 302 to the client 301, and then the minimum code rate is set as the preset lower limit code rate) after the client 301 requests the server 302 to distribute media, then the client 301 determines that the server 302 transmits the segment with a low code rate first.

If the client 301 receives a segment with a high code transmitted by the server 302 first and then receives a segment with a low code rate transmitted by the server 302 after it requests the server 302 to distribute media, then it is determined that the server 302 transmits the segment with a high code rate first. If the client 301 receives a segment with a low code rate transmitted by the server 302 first and then receives a segment with a high code rate transmitted by the server 302, then it is determined that the server 302 transmits the segment with a low code rate first.

In particular, if the client 301 receives a first segment transmitted by the server 302 having a code rate lower than the preset upper limit code rate and higher than the preset lower limit code rate after it requests the server 302 to distribute media, then the server 302 waits to receive a next segment, and if a code rate of the received next segment is lower than the code rate of the first segment, then it is determined that the server 302 transmits the segment with a high code rate first; if a code rate of the received next segment is higher than the code rate of the first segment, then it is determined that the server 302 transmits the segment with a low code rate first.

There are many modes for determining by the client 301 itself. The above mode is just for illustration.

Mode 2: the client 301 determines according to first indication information transmitted by the server 302.

The first indication information is used to indicate whether the server 302 transmits the segment with a high code rate first. Optionally, if the client 301 establishes a WebSocket two-way connection with the server 302, then streaming media is transmitted based on the established WebSocket two-way connection, and the StreamInfo message as shown in Table 1 can be modified so as to provide the first indication information in the StreamInfo message. For example, as shown in Table 2 below, a key "bitratePriority" can be added to the StreamInfo message as shown in Table 1, and the first indication information is provided through the key "bitratePriority". For example, in Table 2, the key "bitratePriority" is located behind the key "multipleRepresentation". In actual implementation, location of the key "bitratePriority" is not limited to the location as shown in Table 2, for example, it can be located in the end of the entire message.

Type of a value of "bitratePriority" in Table 2 is Boolean. A value of "true" denotes that the server 302 transmits the segment with a high code rate first, and a value of "false" denotes that the server 302 transmits the segment with a low code rate first. In actual implementation, the value of "bitratePriority" can be of other type, such as a number. Value of "1" denotes that the server 302 transmits the segment with a high code rate first, and value of "0" denotes that the server 302 transmits the segment with a low code rate first. The specific implementation is not limited to the above examples, only if the client 301 can determine that the server 302 transmits the segment with a high code rate first or transmits the segment with a low code rate first.

TABLE 2

| Name of key | Type of value | Description |
| --- | --- | --- |
| streamDescriptor | Number | streamDescriptor |
| mediaDescriptor | Number | segmentDescriptor |
| multipleRepresentation | Boolean | optional, a value of true denotes that the server transmits a plurality of segments with same content and different code rates to the client |
| bitratePriority | Boolean | optional, bitratePriority only appears when the value of multipleRepresentation is true; a value of true denotes that the server transmits the segment with a high code rate first, and a value of false denotes that the server transmits the segment with a low code rate first. |
| segmentSkipped | Boolean | optional, a value of true denotes that the server skips some segments to distribute and live-broadcast the newest segments |
| minBufferTime | Number | optional, minimum buffer time |
| minNetworkBufferTime | Number | optional, denoting duration of data to be buffered at least by the client when it starts to decode segment data |
| Segment | Object | optional, denoting attribute of segments in subsequent binary frames |

Optionally, in order to realize that the client receives a segment reliably, when it is determined that the server 302 transmits the segment with a high code rate first, after starting to receive the segment with a high code rate, the client 301 can further determine whether receipt of the segment with a high code rate is completed within a first time threshold after it starts to receive the segment with a high code rate. If the receipt of the segment with a high code rate is not completed within the first time threshold, the client 301 can abandon receiving the segment with a high code rate, and starts to receive the segment with a low code rate.

Optionally, the client 301 can start to time after starting to receive the segment with a high code rate. Alternatively, the client 301 can start to time after it is determined that the server 302 transmits the segment with a high code rate first.

Optionally, if the client 301 determines whether the server 302 transmits the segment with a high code rate first or transmits the segment with a low code rate first after it requests the server 302 to distribute media and before the server 302 distributes the respective segments to the client 301, then the client 301 can also start to time after it requests the server 302 to distribute media.

Optionally, in order to save network transmission resource and improve segment transmission efficiency between the client 301 and the server 302, if the client 301 completes the receipt of the segment with a high code rate within the first time threshold, then the client 301 transmits second indication information to the server 302, the second indication information is used to notify the server 302 that there is no need to transmit the segment with a low code rate.

Optionally, if the client 301 establishes the WebSocket two-way connection with the server 301, streaming media is transmitted based on the established WebSocket two-way connection, then the client 301 can determine whether the receipt of the segment is completed according to indication information in the WebSocket frame.

Figure 4:
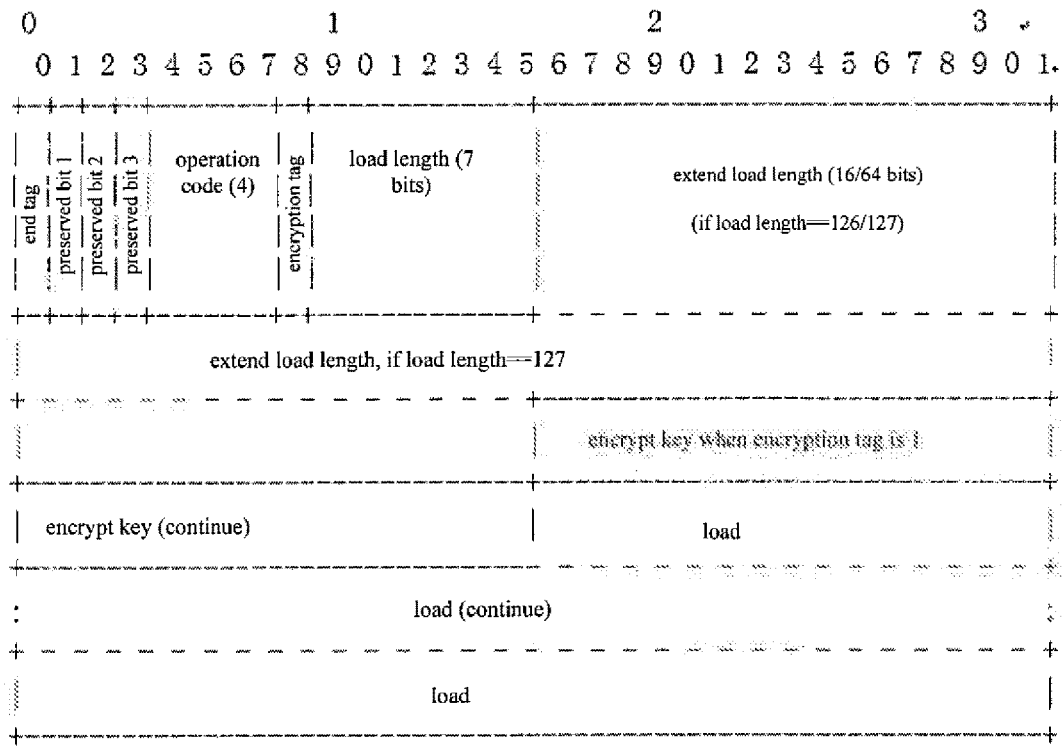
FIG. 4 is a schematic diagram of a structure of a WebSocket frame.

A structure of WebSocket frame is as shown in FIG. 4. Herein, operation code occupies 4 bits. Corresponding relationships between values of the operation code and meanings expressed by the operation code are as follows.

0: combined with an end tag, denoting an intermediate segment of a segmented frame
1: text frame
2: binary frame
3-7: preserved
8: close connection
9: Ping command
A: Pong command
B-F: preserved If data to be transmitted is too large and cannot be encapsulated in one WebSocket binary frame, the WebSocket protocol prescribes that the data to be transmitted can be segmented:

For a frame not segmented: end tag=1, operation code≠0
For a frame segmented:
a first segment: end tag=0, operation code≠0
second to $(N-1)^{th}$ segment s: end tag=0, operation code=0
an N-th segment, i.e., the last segment: end tag=1, operation code=0

After receiving a text frame including the StreamInfo message transmitted by the server 302, the client 301 starts to receive a segment transmitted by the server 302. If one segment is too large, then this segment can be divided into a plurality of fragments. The plurality of fragments can be placed in a plurality of WebSocket binary frames to be transmitted. In particular, one fragment is transmitted in one WebSocket binary frame.

The server 302 transmits one segment through one or more binary frames. When the client 301 receives a binary frame with an end tag of "0" and an operation code different from "0", it determines that the current segment is transmitted in fragments (i.e., one segment is transmitted by a plurality of binary frames), that this binary frame includes a first fragment of the segment, and that binary frames including the remaining fragments of the segment need to be received subsequently. The client 301 receives subsequent binary frames constantly until the end tag of the received binary frame is "0" and the operation code thereof is "0", and then it determines that the receipt of the segment is already completed.

As described above, if the client 301 completes the receipt of the segment with a high code rate within the first time threshold, then the client 301 transmits second indication information to the server 302, the second indication information is used to notify the server 302 that there is no need to transmit the segment with a low code rate. The second indication message can be transmitted by a newly defined message ReceiveReport as shown in Table 3.

TABLE 3

| Control message | | transmitter | |
|---|---|---|---|
| (cmdCode) | description | client | server |
| ReceiveReport | Reporting receipt status of the segment to the server so that the server adjusts transmission of the segments. For example, when a value of a multipleRepresentation is true and a value of bitratePriority is true, if the client has received the segment with a high code rate and informs it to the server through this message, the server would cancel transmission of the segment with a low code rate. | Yes | |

Optionally, the message can include key-value pairs listed in the following Table 4.

TABLE 4

| Key name | Type of value | Description |
|---|---|---|
| adaptation SetID | String | ID of Adaptation Set where the segment is located |
| representationID | String | ID of Representation where the segment is located |
| segmentNumber | Number | Serial Number of the segment |
| ReceiveStatus | Boolean | Denoting receipt status of the segment identified by segmentNumber; True denotes being received successfully, and False denotes being received unsuccessfully. |

If the client 301 completes the receipt of the segment with a high code rate within the first time threshold, then the client 301 transmits the ReceiveReport message to the server, and ReceiveStatus of the message is True. After receiving the message, the server 302 would not transmit the segment with a low code rate to the client 301.

If the client 301 does not complete the receipt of the segment with a high code rate within the first time threshold, then the client 301 would transmit the ReceiveReport message to the server 302, and ReceiveStatus of the message is False. The server 302 would stop transmitting the segment with a high code rate, and starts to transmit the segment with a low code rate.

The processing scheme in the case of determining by the client 301 that the server 302 transmits the segment with a high code rate first is described above in detail. A processing scheme in the case of determining by the client 301 that the server 302 transmits the segment with a low code rate first will be described below.

If it is determined that the server 302 transmits the segment with a low code rate first, then the client 301 continues to receive the segment with a high code rate after it starts to receive the segment with a low code rate.

Optionally, the client 301 determines whether a plurality of segments with high code rates exist. If a plurality of segments with high code rates exist, then the client 301 selects one from the plurality of existing segments with high code rates according to network band width between the client 301 and the server 302 and starts to receive it.

After starting to receive the segment with a high code rate, the client 301 determines whether the receipt of the segment with a high code rate is completed within the second time threshold after it starts to receive the segment with a high code. If the client 301 determines that the receipt of the segment with a high code rate is not completed within the second time threshold after it starts to receive the segment with a high code rate, then the client 301 decodes the segment with a low code rate whose receipt is already completed.

Optionally, the client 301 can also start to time after determining that the server 302 transmits the segment with a low code rate first.

Optionally, as described above, if the client 301 determines whether the server 302 transmits the segment with a high code rate first or transmits the segment with a low code rate first after it requests the server 302 to distribute media and before the server 302 distributes the respective segments to the client 301, then the client 301 can start to time after it requests the server 302 to distribute media.

In this optional solution, after receiving the segment with a low code rate first, the client 301 does not decode the received segment with a low code rate, but waits to receive the segment with a high code rate. If the client 301 completes the receipt of the segment with a high code rate within the second time threshold after it requests the server 302 to distribute media, then the client 301 decodes the segment with a high code rate, and abandons the segment with a low code rate received previously; if the client 301 does not complete the receipt of the segment with a high code rate within the second time threshold after it requests the server 302 to distribute media, then the client 301 decodes the segment with a low code rate whose receipt is completed, to ensure reliability of receipt of the segment.

The first time threshold and the second time threshold can be determined by a variety of modes including following modes:

Mode 1: they are preset durations, for example, being pre-configured according to network topology between the client 301 and the server 302;

Mode 2: the client 301 divides a number of segment bytes included in URL of the segment by a value of a bandwidth attribute of a presentation to which the segment belongs in MPD to calculate and obtain duration needed for transmitting the segment, and then the first time threshold and the second time threshold are determined according to the calculated duration;

Mode 3: it is determined according to play duration of the segment, for example, setting the first time threshold and/or the second time threshold as the play duration of the segment, i.e., a value of a duration attribute of the presentation to which the segment belongs or setting the first time threshold and/or the second time threshold as a half of the value.

Mode 4: it is adjusted in real time according to network status (such as network congestion status, content obtaining duration, decoding duration, and duration that the buffer media can be played and so on) obtained in real time between the client 301 and the server 302.

Attributes of the presentation to which the segment belongs described in MPD are shown in Table 5 below.

TABLE 5

| Element/attribute name | description |
| --- | --- |
| Representation | Presentation element |
| @bandwidth | Network bandwidth needed for transmitting the segment included in the presentation; the higher the network bandwidth needed is, the higher the code rate of the content included in the segment is. |
| @frameRate | Frame rate of the content included in the segment; the higher the frame rate is, the higher the code rate of the content included in the segment is. |
| SegmentList | Segment list |
| @duration | Denoting play duration of each segment; play duration of a plurality of segments in one presentation is the same and takes second as a unit. |
| @startNumber | Denoting a serial number of a first segment included in the presentation |
| SegmentURL | An actual address for obtaining a segment; each segment is corresponding to one SegmentURL |

Figure 5:
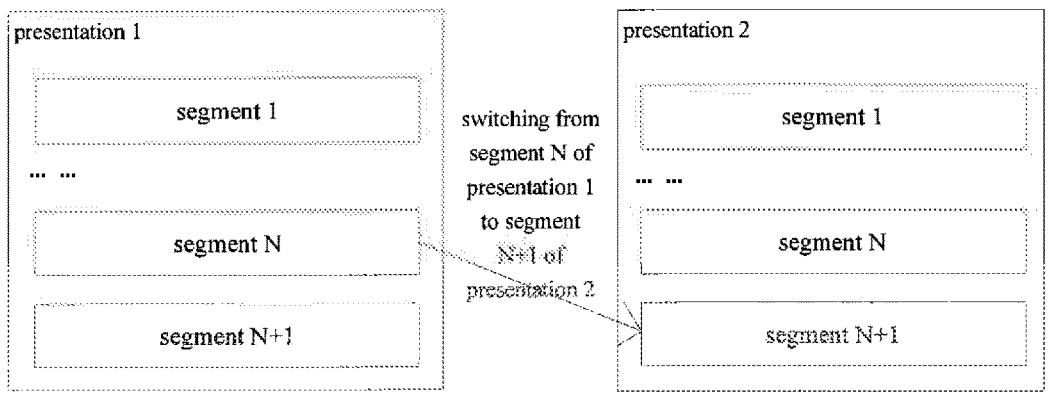
FIG. 5 is a schematic diagram of a manner for code rate switching.

In the embodiment of the present disclosure, the client 301 can switch the code rate in a mode as shown in FIG. 5:

The client 301 finds in MPD a presentation (for the purpose of clear description, it is denoted as "presentation 1" herein) to which a segment being played currently belongs, and calculates a serial number of the current segment as startNumber+N according to a value of the startNumer attribute in the presentation 1 and an arrangement serial number (being denoted as N) of SegmentURL element corresponding to the segment; next, the client 301 finds a presentation (being noted as "presentation 2) ready to be switched that belongs to a same adaptation set, includes the same content and has a different code rate, and finds in the presentation 2 a segment (being noted as a segment N+1) having a serial number startNumber+N+1; then, the client 301 requests to the server 302 the segment N+1 in the presentation 2.

The above description introduces solutions of the streaming media transmission system and solutions for switching code rate provided in the embodiment of the present disclosure. Although the solution of the streaming media data transmission is introduced from the viewpoint of mutual corporation of the client and the server, it does not mean that the client and the server must be cooperated with each other. In fact, when the client and the server are implemented separately, problems existing at a client side and at a server side are solved respectively, only that when the client and the server are implemented in combination, a better technical effect would be achieved.

The client, server and two streaming media data transmission methods provided in the embodiment of the present disclosure will be introduced below respectively. Since their principle for solving the technical problem is similar to the streaming media data transmission system provided in the embodiment of the present disclosure, their implementation can refer to the implementation of the system, and thus repetitive description is not provided herein.

Figure 6:
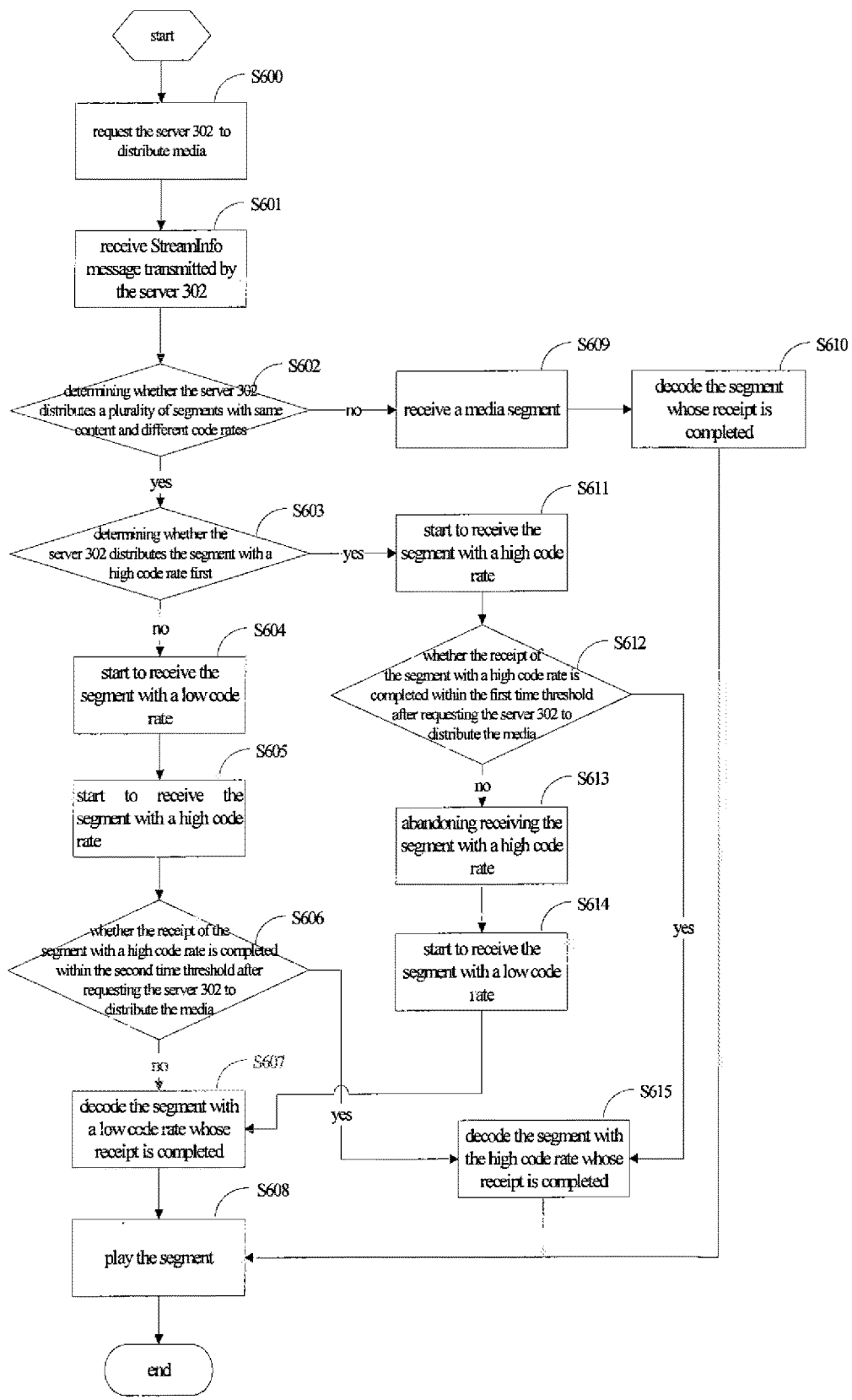
FIG. 6 is a flowchart of a process of streaming media data transmission of a client in a first embodiment of the present disclosure.

A processing example of streaming media data transmission of the client 301 in a first embodiment of the present disclosure will be described below by referring to FIG. 6.

In step S600, the client 301 requests the server 302 to distribute media.

In step S601, the client 301 receives a StreamInfo message transmitted by the server 302.

In step S602, the client 301 determines whether the server 302 distributes a plurality of segments with same content and different code rates according to indication information multipleRepresentation in the StreamInfo message. If a value of multipleRepresentation is false, then the client 301 determines that the server 302 distributes a segment with only one code rate. Then, step S609 is executed. If a value of mulipleRepresentation is true, then the client 301 determines that the server 302 distributes a plurality of segments with same content and different code rates. Then, step S603 is executed.

In step S603, the client 301 determines whether the server 302 distributes the segment with a high code rate first according to the indication information bitratePriority in the StreamInfo message. If a value of bitratePriority is true, then the client 301 determines that the server 302 distributes the segment with a high code rate first. Then, step S611 is executed. If the value of bitratePriority is false, then the client 301 determines that the server 302 distributes the segment with a low code rate first. Then, step S604 is executed.

In step S604, the client 301 starts to receive the segment with a low code rate.

In step S605, the client 301 starts to receive the segment with a high code rate.

In step S606, the client 301 determines whether the receipt of the segment with a high code rate is completed within the second time threshold after it requests the server 302 to distribute media. If the receipt of the segment with a high code rate is completed, then step S615 is executed; otherwise, step S607 is executed.

In step S607, the segment with a low code rate whose receipt is completed is decoded.

In step S608, the segment is played.

In the case that the client 301 determines that the server 302 distributes the segment with only one code rate according to the indication information multipleRepresentatin in the StreamInfo message in step S602, then the client 301 receives the media segment distributed by the server 302 in step S609.

Then, in step S610, the segment whose receipt is completed is decoded. Next, step S608 is executed.

In the case that the client 301 determines that the server 302 distributes the segment with a high code rate first according to the indication information bitratePriority in the Streaminfo message in step S603, then the client 301 starts to receive the segment with a high code rate in step S611.

Then, in step S612, the client 301 determines whether the receipt of the segment with a high code rate is completed within the first time threshold after it requests the server 302 to distribute media. If the receipt of the segment with a high code is completed, then step S615 is executed; otherwise, step S613 is executed.

In step S613, the client 301 abandons receiving the segment with a high code rate.

In step S614, the client 301 starts to receive the segment with a low code rate. Next, step S607 is executed.

In step S615, the client 301 decodes the segment with a high code rate whose receipt is completed.

Figure 7A:
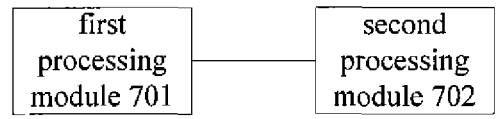
FIG. 7A is a schematic diagram of a first structure of a client provided in an embodiment of the present disclosure.

FIG. 7A is a schematic diagram of a first structure of a client provided in an embodiment of the present disclosure. As shown in FIG. 7A, the client comprises a first processing module 701 and a second processing module 702.

The first processing module 701 determines whether the server distributes a plurality of segments with same content and different code rates.

The second processing module 702 determines whether the server transmits a segment with a high code rate first or transmits a segment with a low code rate first when the first processing module 701 determines that the server distributes a plurality of segments with same content and different code rates.

Figure 7B:
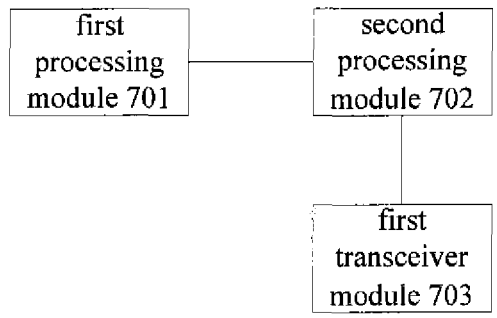
FIG. 7B is a schematic diagram of a second structure of a client provided in an embodiment of the present disclosure.

Optionally, as shown in FIG. 7B, the client can further comprise a first transceiver module 703 configured to start to receive the segment with a high code rate when the second processing module 702 determines that the server transmits the segment with a high code rate first.

Optionally, for the client as shown in FIG. 7B, the second processing module 702 is further configured to, after the first transceiver module 703 starts to receive the segment with a high code rate, determine whether the first transceiver module 703 completes receipt of the segment with a high code rate within a first time threshold after the first transceiver module 703 starts to receive the segment with a high code rate.

If the first transceiver module 703 does not complete the receipt of the segment with a high code rate within the first time threshold, then the second processing module 702 controls the first transceiver module 703 to abandon receiving the segment with a high code rate and start to receive the segment with a low code rate.

Further, the second processing module 702 is further configured to control the first transceiver module 703 to transmit second indication information to the server if the first transceiver module 703 completes the receipt of the segment with a high code rate within the first time threshold, the second indication information is used to notify the server that there is no need to transmit the segment with a low code rate.

Figure 7C:
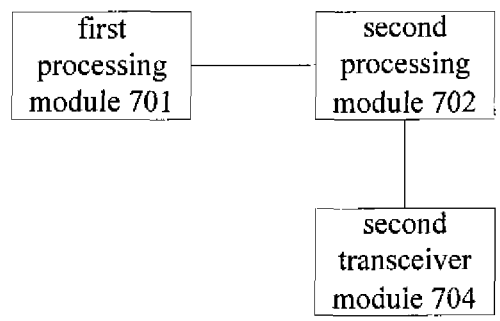
FIG. 7C is a schematic diagram of a third structure of a client provided in an embodiment of the present disclosure.

Optionally, as shown in FIG. 7C, the client further comprises: a second transceiver module 704 configured to start to receive the segment with a low code rate when the second processing module 702 determines that the server transmits the segment with a low code rate first, and continuously start to receive the segment with a high code rate after receiving the segment with a low code rate.

Optionally, after receiving the segment with a low code rate, the second transceiver module 704 does not decode the received segment with a low code rate directly, but determines whether to decode the received segment with a low code rate according to a control of the second processing module 702.

Optionally, for the client as shown in FIG. 7C, the second processing module 702 is further configured to, after the second transceiver module 704 starts to receive the segment with a high code rate, determine whether the second transceiver module 704 completes the receipt of the segment with a high code rate within a second time threshold after starting to receive the segment with a high code rate.

If the second transceiver module 704 does not complete the receipt of the segment with a high code rate within the second time threshold, then the second processing module 702 controls the second transceiver module 704 to decode the segment with a low code rate whose receipt is completed.

Further, the second processing module 702 is further configured to: control the second transceiver module 704 to abandon receiving the segment with a high code rate if the second transceiver module 704 does not complete the receipt of the segment with a high code rate within the second time threshold.

Figure 7D:
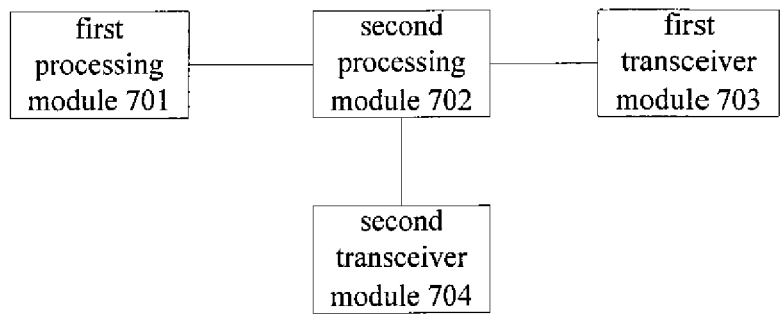
FIG. 7D is a schematic diagram of a fourth structure of a client provided in an embodiment of the present disclosure.

Optionally, the client provided in the embodiment of the present disclosure has a structure as shown in FIG. 7D, and comprises the first processing module 701, the second processing module 702, the first transceiver module 703 and the second transceiver module 704. Processing of the first processing module 701 and the second processing module 702 can refer to the processing of the same modules in the client as shown in FIGS. 7A-7C; interaction between the first transceiver module 703 and the second processing module 702 can refer to the processing in the client as shown in FIG. 7B, interaction of the second transceiver module 704 and the second processing module 702 can refer to the processing in the client as shown in FIG. 7C, and thus no further description is provided herein.

Optionally, for the client as shown in any one of FIGS. 7A-7D, the second processing module 702 is in particular configured to: determine whether the server transmits the segment with a high code rate first or transmits the segment with a low code rate first according to first indication information sent by the server and used to indicate whether the server transmits the segment with a high code rate first.

Optionally, the first indication information is located in the StreamInfo message.

Figure 8:
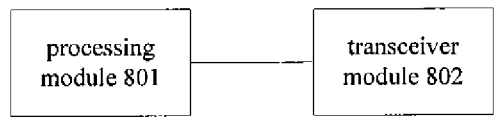
FIG. 8 is a schematic diagram of a structure of a server provided in an embodiment of the present disclosure.

FIG. 8 is a schematic diagram of a structure of a server provided in an embodiment of the present disclosure. As shown in FIG. 8, the server comprises: a processing module 801 and a transceiver module 802.

The processing module 801 determines whether a segment with a high code rate is transmitted first or a segment with a low code rate is transmitted first when a plurality of segments with same content and different code rates are distributed to the client.

The transceiver module 802 sends the first indication information used to indicate whether the segment with a high code rate is transmitted first to the client.

Optionally, the transceiver module 802 is further configured to: after the first indication information is sent to the client, receive second indication information transmitted by the client and used to indicate the server that there is no need to transmit the segment with a low code rate to the client; and stop transmitting the segment with a low code rate to the client according to the second indication information.

Figure 9:
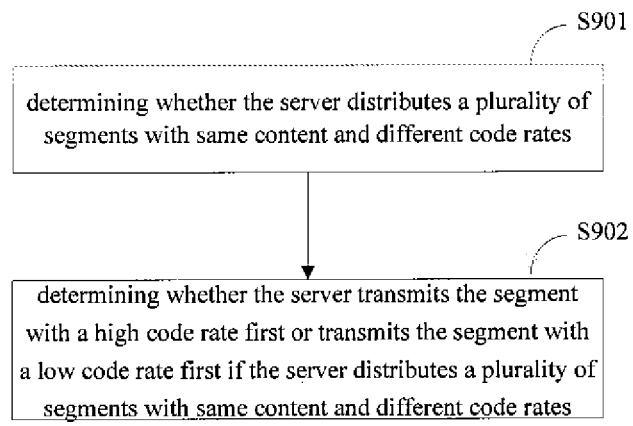
FIG. 9 is a flowchart of a streaming media data transmission method provided in an embodiment of the present disclosure.

FIG. 9 is a flowchart of a streaming media data transmission method provide in an embodiment of the present disclosure. The streaming media data transmission method as shown in FIG. 9 can be applicable to a client.

In step S901, it is determined whether a server distributes a plurality of segments with same content and different code rates.

In step S902: it is determined whether the server transmits the segment with a high code rate first or transmits the segment with a low code rate first if the server distributes a plurality of segments with same content and different code rates.

Optionally, if it is determined in step S902 that the server transmits the segment with a high cod rate first, then the segment with a high code rate starts to be received.

Optionally, after starting to receive the segment with a high code rate, the streaming media data transmission method further comprises: determining whether receipt of the segment with a high code rate is completed within a first time threshold after starting to receive the segment with a high code rate; and abandoning receiving the segment with a high code rate and starting to receive the segment with a low code rate if it is determined that the receipt of the segment with a high code rate is not completed within the first time threshold.

Optionally, the streaming media data transmission method further comprises: transmitting second indication information to the server if it is determined that the receipt of the segment with a high code rate is completed within the first time threshold, the second indication information is used to notify the server that there is no need to transmit the segment with a low code rate.

Optionally, if it is determined in step S902 that the server transmits the segment with a low code rate first, then the segment with a high code rate starts to be received continuously after the segment with a low code rate is received.

Optionally, after the segment with a low code rate is received, the streaming media data transmission method further comprises: not decoding the received segment with a low code rate directly, but determining whether to decode the received segment with a low code rate according to receipt status of the segment with a high code rate.

Optionally, after starting to receive the segment with a high code rate, the streaming media data transmission method further comprises: determining whether the receipt of the segment with a high code rate is completed within a second time threshold after starting to receive the segment with a high code rate; and decoding the segment with a low code rate whose receipt is completed if the receipt of the segment with a high code rate is not completed within the second time threshold.

Optionally, the streaming media data transmission method further comprises: abandoning receiving the segment with a high code rate if the receipt of the segment with a high code rate is not completed within the second time threshold.

Optionally, determining in step S902 whether the server transmits the segment with a high code rate first or transmits the segment with a low code rate first can in particular comprise: receiving the first indication information sent by the server and used to indicate whether the server transmits the segment with a high code rate first; and determining whether the server transmits the segment with a high code rate first or transmits the segment with a low code rate first according to the received first indication information.

Optionally, the first indication information is located in the StreamInfo message.

Figure 10:
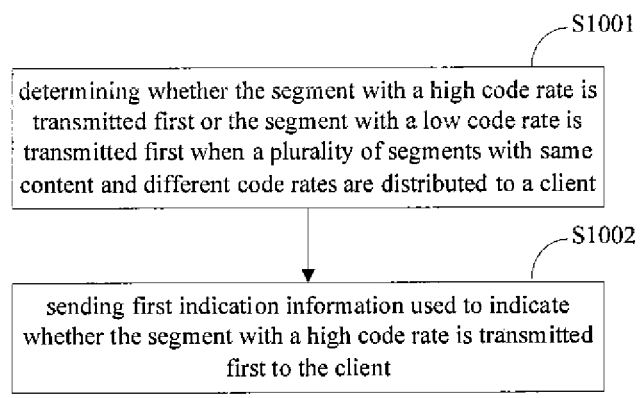
FIG. 10 is a flowchart of another streaming media data transmission method provided in an embodiment of the present disclosure.

FIG. 10 is a flowchart of another streaming media data transmission method provided in an embodiment of the present disclosure. The streaming media data transmission method as shown in FIG. 10 can be applicable to a server.

In step S1001: it is determined whether a segment with a high code rate is transmitted first or a segment with a low code rate is transmitted first when a plurality of segments with same content and different code rates are distributed to a client.

In step S1002: first indication information used to indicate whether the segment with a high code rate is transmitted first is sent to the client.

Optionally, after the first indication information is sent to the client in step S1002, the streaming media data transmission method further comprises: receiving second indication information sent by the client and used to indicate the server that there is no need to transmit the segment with a low code rate to the client; and stopping transmitting the segment with a low code rate to the client according to the second indication information.

To sum up, the embodiments of the present disclosure provide a streaming media data transmission apparatus, method and system. Herein, the client is capable of determining whether the server transmits a segment with a high code rate first or transmits a segment with a low code rate first when the server distributes a plurality of segments with same content and different code rates, then when it is determined that the server transmits the segment with a high code rate first, there is not need to wait the server to distribute a segment with a higher code rate but to decode the received segment directly, so that time delay of decoding at the client is shortened.

Further, the client determines whether the server transmits the segment with a high code rate first or transmits the segment with a low code rate first according to the segments with respective code rates transmitted by the server, or the client determines whether the server transmits the segment with a high code rate first or transmits the segment with a low code rate first according to the first indication information distributed by the server. Thus, two specific modes of determining of the client are provided.

In addition, if the client is capable of completing the receipt of the segment with a high code rate within the present time threshold, then the client indicates the server to stop transmitting the segment with a low code rate, so that the server's efficiency of transmitting the segment is improved and network transmission resource is saved.

On the other hand, if the client cannot complete the receipt of the segment with a high code rate within the preset time threshold, then the client receives the segment with a low code rate and decodes it, so that reliability of streaming media data transmission and continuity of media playing are ensured, and user experience is enhanced.

Those skilled in the art shall understand that the embodiments of the present disclosure can be provided as a method, a system or a computer program product. Therefore, the present disclosure can adopt forms of a full hardware embodiment, a full software embodiment, or an embodiment of combining software and hardware. Furthermore, the present disclosure can adopt a form of a computer program product implemented on one or more computer-readable storage media (including but not limited to magnetic disc memory, CD-ROM, and optional memory and so on) containing a computer-readable program code.

The present disclosure is described by referring to flowcharts and/or block diagrams of the method, device (system), and computer program product according to the embodiments of the present disclosure. It shall be understood that each flow and/or block of flowcharts and/or block diagrams and a combination of flows and/or blocks of flowcharts and/or block diagrams can be implemented by computer program instructions. There computer program instructions can be provided to a general computer, a specific computer, an embedded processor or processors of other programmable data processing devices to generate a machine, so that an instruction executed by a computer or a processor of other programmable data processing device generates an apparatus configured to implement the functions specified in one flow or a plurality of flows of flowcharts and/or one block or a plurality of blocks of block diagrams.

These computer program instructions can also be stored in a computer readable memory being capable of booting a computer or other programmable data processing devices to operate in a particular way, so that the instruction stored in the computer readable memory comprises a manufacturer including an instruction apparatus. This instruction apparatus implements functions specific in one flow or a plurality of flows of flowcharts and/or one block or a plurality of blocks of block diagrams.

These computer program instructions can be loaded to a computer or other programmable data processing devices, so that a series of operation steps are executed on the computer or other programmable devices to generate processing implemented by the computer. Thus, the instructions executed on the computer or other programmable devices provide steps used for realizing the functions specific in one flow and/or a plurality of flows of flowcharts and/or block or a plurality of blocks of block diagrams.

Although preferable embodiments of the present disclosure are described, those skilled in the art can make additional alterations and amendments to these embodiments once they know basic inventive concepts. Therefore, the claims intend to be explained as including the preferable embodiments and all the alternations and amendments falling into the scope of the present disclosure.

Obviously, those skilled in the art can make various alternations and modifications to the present disclosure without departing from the spirit and scope thereof. As such, if these amendments and modifications of the present disclosure belong to the scope of the claims and their equivalent technology, then the present disclosure intends to include these alternations and modifications.

The present application claims the priority of a Chinese patent application No. 201510024568.1 filed on Jan. 16, 2015 with an invention title of "STREAMING MEDIA DATA TRANSMISSION APPARATUS, METHOD AND SYSTEM". Herein, the content disclosed by the Chinese patent application is incorporated in full by reference as a part of the present disclosure.

What is claimed is:

1. A client device, comprising:
   a processor;
   a storage; and
   a set of computer readable instructions stored on the storage that, when executed by the processor, causes the processor to perform the steps of:
   determining whether a server transmits, to this client device, a plurality of segments with same content and different code rates according to a first key in a SteamInfo message compliant with MPEG (Moving Pictures Experts Group) DASH (Dynamic Adaptive Streaming over HTTP) standard and sent by the server to this client device; and
   determining whether the server transmits, to this client device, a segment with a high code rate first and then a segment with a low code rate or transmits, to this client device, a segment with a low code rate first and then a segment with a high code rate according to a second key in the SteamInfo message compliant with MPEG DASH standard used to indicate whether the server transmits, to this client device, the segment with a high code rate first and then a segment with a low code rate and sent by the server, and generating a control message compliant with MPEG DASH standard for reporting receipt status of the segment to the server so that the server adjusts transmission of the segments when it is determined that the server transmits, to this client device, a plurality of segments with same content and different code rates.

2. The client device according to claim 1, wherein the processor further performs the step of:
   starting to receive the segment with a high code rate if the server transmits the segment with a high code rate first.

3. The client device according to claim 2, wherein the processor further performs the steps of:
   determining whether receipt of the segment with a high code rate is completed within a first time threshold after starting to receive the segment with a high code rate;
   abandoning receiving the segment with a high code rate and starting to receive the segment with a low code rate if the receipt of the segment with a high code rate is not completed within the first time threshold.

4. The client device according to claim 3, wherein the processor further performs the step of:
   transmitting the control message compliant with MPEG DASH standard to the server if the receipt of the segment with a high code rate is completed within the first time threshold, the control message compliant with MPEG DASH standard being used to notify the server that there is no need to transmit the segment with a low code rate.

5. The client device according to claim 1, wherein the processor further performs the step of:
   starting to receive the segment with a low code rate if the server transmits the segment with a low code rate first, and continuously starting to receive the segment with a high code rate after the segment with a low code rate is received.

6. The client device according to claim 5, wherein the processor further performs the steps of: after starting to receive the segment with a high code rate,
   determine whether the receipt of the segment with a high code rate is completed within a second time threshold after starting to receive the segment with a high code rate; and
   decoding the segment with a low code rate whose receipt is completed if the receipt of the segment with a high code rate is not completed within the second time threshold.

7. The client device according to claim 6, wherein the processor further performs the step of abandoning receiving the segment with a high code rate if the receipt of the segment with a high code rate is not completed within the second time threshold.

8. A streaming media data transmission method for a client device, comprising:
   determining whether a server transmits, to this client device, a plurality of segments with same content and different code rates according to a first key in a SteamInfo message compliant with MPEG DASH standard and sent by the server to this client device; and
   determining whether the server transmits, to this client device, a segment with a high code rate first and then a segment with a low code rate or transmits, to this client device, a segment with a low code rate first and then a segment with a high code rate according to a second key in the SteamInfo message compliant with MPEG DASH standard used to indicate whether the server transmits, to this client device, the segment with a high code rate first and then a segment with a low code rate and sent by the server, and generating a control message compliant with MPEG DASH standard for reporting receipt status of the segment to the server so that the server adjusts transmission of the segments if the server transmits, to this client device, the plurality of segments with same content and different code rates.

9. The method according to claim 8, further comprising:
   starting to receive the segment with a high code rate if the server transmits the segment with a high code rate first;
   determining whether receipt of the segment with a high code rate is completed within a first time threshold after starting to receive the segment with a high code rate; and
   abandoning receiving the segment with a high code rate and starting to receive the segment with a low code rate if the receipt of the segment with a high code rate is not completed within the first time threshold.

10. The method according to claim 9, further comprising: sending the control message compliant with MPEG DASH standard to the server if the receipt of the segment with a high code rate is completed within the first time threshold, the control message compliant with MPEG DASH standard being used to notify the server that there is no need to transmit the segment with a low code rate.

11. The method according to claim 8, further comprising:
    starting to receive the segment with a low code rate if the server transmits the segment with a low code rate first, and starting to receive the segment with a high code rate continuously after the segment with a low code rate is received.

12. The method according to claim 11, further comprising: after starting to receive the segment with a high code rate,
    determining whether the receipt of the segment with a high code rate is completed within a second time threshold after starting to receive the segment with a high code rate; and
    decoding the segment with a low code rate whose receipt is completed if the receipt of the segment with a high code rate is not completed within the second time threshold.

13. The method according to claim 12, further comprising:
    abandoning receiving the segment with a high code rate if the receipt of the segment with a high code rate is not completed within the second time threshold.

14. A streaming media data transmission method for a server, comprising:
    sending a first key in a SteamInfo message compliant with MPEG DASH standard used to indicate whether to transmit a plurality of segments with same content and different code rates to a client device;
    determining whether a segment with a high code rate is transmitted first or a segment with a low code rate is transmitted first when a plurality of segments with same content and different code rates are transmitted to the client device;
    sending a second key in the SteamInfo message compliant with MPEG DASH standard used to indicate whether the segment with a high code rate is transmitted first to the client device; and
    receiving a control message compliant with MPEG DASH standard and sent by the client device, and adjusting transmission of the segments according to the control message compliant with MPEG DASH standard.

15. The method according to claim 14, wherein, the control message compliant with MPEG DASH standard is used to indicate the server that there is no need to transmit the segment with a low code rate to the client device, and adjusting transmission of the segments according to the control message compliant with MPEG DASH standard comprises:
  stopping transmitting the segment with a low code rate to the client device according to the control message compliant with MPEG DASH standard.

* * * * *